3,579,328
PROCESS FOR THE PRODUCTION OF FERRO-VANADIUM DIRECTLY FROM SLAG OBTAINED FROM VANADIUM-CONTAINING PIG IRON

Helge Aas, Svelgen, and Rolf Nordheim, Oslo, Norway, assignors to Christiania Spigerverk, Oslo, Norway
No Drawing. Filed Apr. 11, 1968, Ser. No. 720,461
Claims priority, application Norway, May 31, 1967, 168,400
Int. Cl. C22c *39/50*
U.S. Cl. 75—133.5                                                      5 Claims

ABSTRACT OF THE DISCLOSURE

A process is provided for the production of ferrovanadium from slag obtained from vanadium-containing pig iron or other vanadium-containing material, characterized in that the reduction of the slag is carried out in two steps: (1) in the first step a reducing agent is added in such amounts that the substantial portion of the iron oxide in the slag is substantially reduced to metallic iron, whereas practically none of the vanadium oxide is reduced; whereupon after removing the metallic iron from the slag, the fluid vanadium-rich slag is subjected to a further final reduction step (2) by adding a powerful reducing agent thereto, such as Si-rich ferro-silicon in such amounts that the remaining iron oxide in the slag and the major part of the vanadium oxide therein is reduced, and whereby the reducing agent is added gradually under continuous agitation to avoid local concentrations of the reducing material and the thus-obtained ferrovanadium is removed from the slag in a conventional manner.

---

The present invention relates to a process for the production of ferrovanadium directly from slag containing vanadium, for instance, slags obtained by refining pig iron containing vanadium. The process may also be employed in connection with other vanadium-containing materials, such as vanadium-containing residues from oil refineries.

The slags obtained by refining pig iron containing vanadium generally contain 6–20% V (present as oxide), 10–30% $SiO_2$ and 20–45% FeO. The slag may further contain varying amounts of $TiO_2$ and $Al_2O_3$ in addition to other oxides. The slags may also contain varying amounts of metallic iron (2–40%).

According to the methods used at present for the production of vanadium, the slags containing the vanadium are comminuted, mixed with a sodium salt, such as sodium chloride, or soda, and are roasted at temperatures of 800–1200° C., whereby the essential portion of the vanadium present is converted to a water soluble sodium compound, viz $NaVO_3$. After leaching in water and precipitation of possible impurities, the pH of the solution is adjusted in order to precipitate vanadium pentoxide, $V_2O_5$. This oxide is dried and melted in order to get it into a condition suitable for the subsequent reduction. The said reduction may be carried out aluminothermically, which is the usual procedure. To some extent, however, a silicothermic reduction has also been employed.

The above-mentioned methods are cumbersome and expensive.

The object of the present invention is to provide a process for the production of ferrovanadium directly from slags containing vanadium; such slags are obtained by refining vanadium-containing pig iron, whereby considerable savings may be achieved as compared with the above-mentioned roasting process, which hitherto has been the usual process for the working-up of vanadium-containing slags.

If, however, attempts are made to reduce the slag directly, the resulting ferrovanadium alloy will exhibit a relatively low vanadium content. Even in the case of refining slags rich in vanadium, the ratio V/Fe will hardly exceed 0.5, which, in view of the other impurities present, will make it difficult to prepare an alloy with a vanadium content higher than 25%.

The present inventors have subjected this problem to thorough investigation and experiments, and they have developed a process which makes it possible to prepare ferrovanadium, with a vanadium content of 50% and higher, by a simple and economic process, from the slags of the said type, and at the same time obtaining a high yield of vanadium from the refining slag, which hitherto has been associated with great difficulties.

According to the statements above, the process of the invention relates to the manufacture of ferrovanadium directly from slag obtained from vanadium-containing pig iron, with for instance 6–20% V as oxide, 10–30% $SiO_2$ and 20–45% FeO, or from similar vanadium-containing materials; the process being characterized by the fact that the reduction is performed in two stages. In the first stage, by adding a reducing agent, for example ferrosilicon, in such specifically defined amounts that a substantial amount of the iron oxide in the slag is reduced, whereas practically no part of the vanadium-oxide in the slag is reduced; whereupon after removing the metallic iron from the slag, the fluid vanadium oxide-rich slag is subjected to a further final reduction step by the action of powerful reducing agents, for example 90% Si-ferro-silicon, calcium-silicon or aluminum-silicon alloys, Si-metal or combinations of these, in an amount sufficient to reduce the remaining iron oxide in the slag and the major part of the vanadium oxide in the slag, and whereby the reducing agent is added gradually and under vigorous and continuous agitation for avoiding high local concentrations of the reduction material, whereupon the obtained ferrovanadium is removed from the slag in a known manner.

In the first step, 75% ferrosilicon is conveniently employed as the reducing agent. Ferrosilicon with a lower Si content, such as 45% Si or other materials, may, however, also be used, but it is essential that the reducing agent is employed in such a closely defined amount that practically no part of the vanadium oxide present in the slag is reduced, and such that the obtained slag gets a V/Fe-ratio corresponding to the desired composition of the alloy, e.g. 50% V. In the second final reduction step, a Si-containing reduction material is used, preferably 90% FeSi or Si-metal. In this reduction step, alloys such as calcium-silicon (for example 30% Ca and 60% Si), aluminum-silicon (for example 30% Al and 65% Si) or combinations thereof may be used.

In the first reduction step, the reduction suitable is carried out at a temperature from 1550° C.–1750° C., but more preferably at a temperature in the range of 1600° C.–1700° C. In the second reduction step, the reduction is carried out within the temperature range of 1600° C.–1700° C.

As it appears from the statements above, it is of particular importance that in the second reduction step, the reduction is carried out under vigorous and continuous agitation and further with a carefully controlled gradual addition of the reducing agent to the slag. The reason for the importance of this will be evident from the following description from which other features also will be apparent.

The melting of the vanadium oxide-containing refining slag can advantageously take place in an electric arc furnace of the same construction as the conventional steel furnace, with certain adaptations allowing for the large quantities of slag to be handled (per part by weight of produced metallic iron one has to operate with 2–4 parts by weight of slag).

A high yield of vanadium in the final slag reduction can best be obtained by employing an easily fluid, moderately basic slag, for instance a slag with the ratio percent CaO/percent $SiO_2$ equal to about 1.0–2.0 and with a percentage of MgO within the range of 2–10. The necessary basic components in the slag preferably burnt lime and dolomite, are conveniently added during the melting in the electric arc furnace.

Small amounts of aluminum oxide, e.g. 2–20%, may optionally be added in order to reduce the viscosity of the final slag.

In order to obtain a fluid slag, it will further be necessary to increase the temperature in the electric arc furnace to at least 1650° C. before tapping. During discharge or tapping, the liquid iron (steel) is conveyed to a cast iron ingot mould in order to give it a form suitable for subsequent remelting. The slag is discharged into a preheated ladle, and the final reduction of the slag is started.

In metallurgical processes, it is known to enrich or concentrate especially valuable metals, such as titanium and chromium present in raw materials, by first reducing the most easily reducible part of the raw material as, for example, iron and then removing the reduced iron from the product obtained in this way enriched with the especially valuable metal. An example of such a process is the melting of ilmenite concentrate by a selective reduction of iron and concentration of $TiO_2$ in the slag. In the present process, this known selective reduction process is combined with a further reduction of the relatively iron-poor slag, in such way that without further addition of heat and with a very simple production equipment, alloys can be produced with 50% V or higher and with a vanadium yield which is not substantially different from the yield by using the very complicated conventional process.

The production of ferro-alloys by reduction of a melted ore with Si-containing reduction material is a known method, such as the production of ferro-chromium with a low carbon content. In this process large amounts of melted ore, in a short period of time, is brought in contact with large amounts of the reducing agent, preferably a Cr-Si-alloy. However, in this process, it is not possible to avoid local high concentrations of silicon. In the production of ferro-vanadium, this can result in the formation of heavy melting compounds of silicon and vanadium. Reference, for example, is made to the system vanadium-silicon, which according to Vogel and Jentzsch-Uschinski: Arch. Eisenhüttenwesen, 13 (1940), p. 403 has a liquidus curve exhibiting a maximum at about 2150° C. with about 25% silicon. The liquidus of the ternary system V-Fe-Si exhibits a minimum at about 5% Si with a V/Fe ratio of 0.8–1.2. With increasing Si-content the liquidus curve rises steeply such that an alloy containing 20% Si will have a liquidus temperature higher than 1700° C.

For the reasons discussed above, heavy melting phases may locally be produced during the reduction of vanadium-containing slag, for instance, with silicon (under binding of disproportionately high amounts of silicon), and if such phases are formed, they are extremely difficult to redissolve upon reaction with the remaining melt. A metal with a high content of silicon will then be obtained and the remaining vanadium-content of the slag will be high. In these circumstances, it will also be difficult to separate the slag and the metal.

In order to avoid these problems, the process according to the present invention employs a carefully and accurately controlled addition of the reducing agent in such a way that high concentrations of the reducing agent may not build up locally in the slag. For this reason, the addition of the reducing agent advantageously takes place during a relatively long period of time, e.g. 10–25 minutes and at the same time a continuous and vigorous agitation is maintained as long as the addition takes place.

It is also important to restrict the maximum grain size of the reducing metal, when silicon-containing reducing agents are employed in the final reducing step. When too large grains are employed, a ferro-vanadium very rich in silicon will be formed in the boundary layer around the grains and this may lead to the formation of heavy melting phases as already mentioned.

On the other hand, the particle size of the reducing alloys should not be too small, since this may cause high air oxidation losses and at the same time also cause difficulties in starting the reaction. For these reasons, the grain size of the reducing metal should preferably be restricted to between about 0.2 and 5 mm.

The final reduction of the slag may most conveniently take place in the ladle used in the tapping of the slag. The ladle should be provided with equipment allowing vigorous and continuous agitation. Various forms of rotation, possibly oscillation, of the ladle may be found suitable. Suitable agitation of slag in the ladle may also be achieved by injecting the reducing agents in the slag (with a carrier gas, such as for instance nitrogen).

During the tapping of the slag from the electric arc furnace, the temperature should, as already mentioned, not be below 1650° C. Since the reduction of the slag is an exothermic process, it is possible to maintain this temperature throughout the reduction of the slag. After completion of said reduction, the slag still will be easily fluid and separation of final slag and the ferrovanadium formed will not represent any problems.

The composition of the alloy produced is dependent upon the V/Fe-ratio obtained during the selective reduction in the electric arc furnace. With the present process a V/Fe-ratio of 1.0–2.0 can be established in the slag from the electric arc furnace. In employing the aforesaid reducing agents and a relatively basic slag, it is possible, during the final reduction stage, to reduce vanadium and iron to the same ratio, such that the ferro-vanadium produced also has a V/Fe-ratio between 1.0 and 2.0. In order to achieve a satisfactory yield of vanadium by this reduction, it is, however, necessary to add a certain excess of reducing metal such that a certain amount thereof is obtained in the ferrovanadium produced. If silicon is employed as the reducing agent, a sufficient amount should be added to achieve a silicon content of at least 3% in the final alloy. The final slag may then contain about 2.5% vanadium. If a silicon content of as much as 10% can be tolerated, the vanadium content of the final slag will be reduced to 1.5%. With a silicon content of 5% in the produced ferro-vanadium, it should normally not cause any problems to maintain the vanadium content of the final slag at a maximum of 2% V. If a slag containing, for example, 15% V is used as the raw material, the over-all process will give a yield of vanadium of about 80%, which is very nearly the same as that of the conventional process from slag via vanadium oxide to ferrovanadium.

Most vanadium-containing iron ores contain not insignificant amounts of titanium, and the refining slag obtained from iron produced from such ores will consequently contain relatively large amounts of titanium oxide. As long as the final reduction of the slag is carried out with an excess of the reducing metal within the limits defined above, only a minor portion, however, of the titanium oxide present will be reduced. From a slag containing vanadium and titanium in the ratio V/Ti of about 4:1, a V/Ti ratio in the final slag of about 1000:1 may thus be obtained.

If the vanadium oxide-containing slag contains elements such as manganese and chromium, these elements will accompany the vanadium into the final product. Normally, the presence of these elements will not constitute any problems for the application of the produced ferrovanadium.

The following example is designed to illustrate the present process and not to limit the essential concept of the present invention:

EXAMPLE

A slag with the following composition was employed:

| | Percent |
|---|---|
| V as $V_2O_3$ | 12.2 |
| $SiO_2$ | 15.8 |
| $TiO_2$ | 4 |
| MnO | 1.1 |
| $Cr_2O_3$ | 0.5 |
| CaO | 0.5 |
| FeO | 37.2 |
| Metallic iron | 18.7 |

To 1000 kg. of this slag was charged 700 kg. of burnt lime and 90 kg. of 75% ferrosilicon. The materials were thoroughly mixed and continuously charged to an electric arc furnace during a period of 1.5 hours. After all of the charge had been added to the furnace, the temperature was about 1700° C. A sample of the slag was conveniently withdrawn and analyzed spectrographically in the laboratory. The slag was tapped from the furnace into a ladle and for each 1000 kg. of slag raw material, was obtained 1400 kg. of slag with the following composition:

| | Percent |
|---|---|
| $V_2O_3$ | 8.51 |
| $SiO_2$ | 23.2 |
| CaO | 44.5 |
| MgO | 4.5 |
| FeO | 5.8 |
| $TiO_2$ | 2.8 |
| MnO | 0.75 |
| $CrO_3$ | 0.35 |

At the same time was obtained about 425 kg. steel containing about 0.3% C, 0.02% Si and 0.25% V.

The ladle with the 1400 kg. of fluid slag was under vigorous and continuous agitation charged with ferrosilicon which was added by means of vibration feeder. The amount of the reducing material used was based upon the result of the spectrographic analysis of the slag. In the present example, a total of 83 kg. of 90% ferrosilicon was used, the addition of which took place in the course of 18 minutes. After the final treatment, the temperature was about 1650° C. The ladle was discharged into a cast iron ingot mould provided with means for separating the slag from the produced ferro-vanadium alloy. A total of 169 kg. of alloy was produced with the following composition:

| | Percent |
|---|---|
| V | 57.2 |
| Fe | 32.1 |
| Si | 6.4 |
| Mn | 2.3 |
| Cr | 1.7 |
| Ti | 0.20 |

At the same time, a slag with the following composition was discharged:

| | Percent |
|---|---|
| V (as $V_2O_3$) | 1.7 |
| Fe (1.1% FeO) | 0.8 |
| CaO | 46 |
| $SiO_2$ | 34.5 |
| MgO | 4.9 |

Yield of vanadium from refining slag to alloy: 79%.

Unless otherwise specified, the percentages of the ingredients in the foregoing specification are calculated on the basis of the weight of these ingredients in relation to the total weight of the composition in which they are employed.

What is claimed is:

1. A process for the production of ferrovanadium alloy from vanadium-containing slag comprising as principal constituents 6–2% V present as oxide, 20–45% FeO, and 10–30% $SiO_2$ and the balance consisting essentially of other oxides as $Al_2O_3$, MnO, and $TiO_2$, and also varying amounts of metallic iron, which process comprises:

(1) heating the slag to a temperature in the range of about 1550° to about 1750° C., adding a basic compound containing CaO and MgO in an amount such that the ratio of $CaO/SiO_2$ after the final reduction step (3) herein is about 1.0 to 2.0 and the percentage of MgO is in the range of 2 to 10%, and subjecting the said slag to treatment with a ferrosilicon reducing agent in an amount sufficient to reduce a substantial amount of the iron oxide in the slag without reducing any substantial part of the vanadium oxide in the slag, (2) removing the thus obtained metallic iron from the slag, and (3) subjecting the resultant, vanadium oxide-rich, fluid slag to treatment with a reducing agent selected from the group consisting of Si-rich ferro-silicon, aluminum silicon alloys, Si-metal, and combinations thereof, the said reducing agent being introduced gradually into said resultant slag under conditions of continuous and vigorous agitation of said resultant slag in such a way that high concentrations of the reducing agent do not build up locally in the slag, the amount of said reducing agent used being sufficient to reduce the remaining iron oxide and the major part of the vanadium oxide in the slag and at the same time achieve a silicon content in the ferrovanadium alloy ranging from about 3% to about 10% and the grain size of the reducing agent being about 0.2 to 5 mm., and removing the thus produced ferrovanadium alloy.

2. A process according to claim 1, wherein the first reduction step employs ferro-silicon having a silicon content of about 75% in an amount adjusted based upon the amounts of vanadium-oxide and iron-oxide present in the slag, such that after the reduction, a slag with a V/Fe-ratio corresponding to the desired composition of the finally obtained alloy from the second reduction step is obtained.

3. A process according to claim 1, wherein during the first reduction step, lime is added in such amounts that the slag after the final reduction step has a $CaO/SiO_2$ ratio within the limits of 1.0 to 2.0.

4. A process according to claim 1, wherein the slag is additionally charged with a flux selected from the group consisting of magnesia and alumina-containing fluxes and mixtures thereof in such amounts that the contents of MgO and $Al_2O_3$ in the final slag are within the limits 2 to 10% and 2 to 20%, respectively.

5. A process according to claim 1, wherein the second reduction step is carried out at a temperature of from 1600° C. to 1700° C.

References Cited

UNITED STATES PATENTS

| 866,562 | 9/1907 | Becket | 75—133.5X |
| 1,521,607 | 1/1925 | Dixon | 75—133.5 |
| 1,901,367 | 3/1933 | Gustafsson | 75—133.5 |
| 2,256,901 | 9/1941 | Horgard | 75—133X |
| 2,934,422 | 4/1960 | Udy | 75—24X |

FOREIGN PATENTS

| 642,240 | 1/1950 | Canada | 75—30 |

L. DEWAYNE RUTLEDGE, Primary Examiner

J. E. LEGRU, Assistant Examiner

U.S. Cl. X.R.

75—24, 30, 53, 58, 129, 130

UNITED STATES PATENT OFFICE
CERTIFICATE OF CORRECTION

Patent No. 3,579,328              Dated May 18, 1971

Inventor(s) HELGE AAS ET AL.

It is certified that error appears in the above-identified patent and that said Letters Patent are hereby corrected as shown below:

Claim 1, line 3, correct "6-2%V" to read --6-20%V--

Signed and sealed this 30th day of November 1971.

(SEAL)
Attest:

EDWARD M. FLETCHER, JR.
Attesting Officer

ROBERT GOTTSCHALK
Acting Commissioner of Patents